(12) United States Patent
Aoyama et al.

(10) Patent No.: US 6,316,859 B1
(45) Date of Patent: Nov. 13, 2001

(54) ROTATING ELECTRIC MACHINE

(75) Inventors: Hiroshi Aoyama, Tsuchiura; Hidehiro Ejima, Hitachi; Yoshiyuki Igarashi, Takahagi; Toshio Hattori, Ushiku, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,588

(22) Filed: Aug. 31, 2000

(30) Foreign Application Priority Data

Feb. 14, 2000 (JP) .................................................. 12-039731

(51) Int. Cl.$^7$ ................................. H02K 3/34; H02K 3/48
(52) U.S. Cl. ............................................. 310/214; 310/43
(58) Field of Search ........................................ 310/214, 215, 310/52, 61

(56) References Cited

FOREIGN PATENT DOCUMENTS

| 2000308293-A | * | 2/2000 | (JP) | H02K/03/24 |
| 06214395-A | * | 3/1996 | (JP) | H02K/3/24 |
| 101623344-A | * | 12/1999 | (JP) | H02K/3/34 |
| 10322952-A | * | 12/1998 | (JP) | H02K/3/48 |

* cited by examiner

*Primary Examiner*—Nestor Ramirez
*Assistant Examiner*—Karen Addison
(74) *Attorney, Agent, or Firm*—Antonelli, Terry, Stout & Kraus, LLP (57) ABSTRACT

Provided is a rotating electric machine in which the cooling capacity is improved by increasing the width and depth of a gas vent groove 12 formed in a creepage block 11 and in which a fracture is prevented near the face of the creepage block 11 abutting against a magnetic winding 4 of the creepage block 11 fabricated from a resin material containing reinforcing fibers. The reinforcing fibers of the creepage block 11 fabricated from a resin material containing reinforcing fibers are continuously disposed to form straight lines and curved lines along the contour of the gas vent groove, whereby the area of interlayer slip face 32 subjected to a shearing force acting on the creepage block due to a temperature change of a rotor 1 is increased and the shearing force per unit a slip area is decreased, thereby to prevent a shearing slip fracture near the face of the creepage block 11 abutting against the magnetic winding 4.

10 Claims, 11 Drawing Sheets

ROTATING ELECTRIC MACHINE

BACKGROUND OF THE INVENTION

The present invention relates to a rotating electric machine such as a turbine generator.

A cylindrical rotor of a rotating electric machine such as a conventional turbine generator is provided with a magnetic winding, which excites the generator when the rotor receives a DC current from an exciting power source.

The rotor is provided with a plurality of slots for inserting magnetic windings therein at equally spaced intervals in the circumferential direction thereof, and teeth are installed between the slots. Within each slot, the magnetic winding is disposed in layers and held. When the magnetic winding is energized, the temperature of the conductor may sometimes rise to not less than 100° C. Therefore, in order to prevent a decrease in the strength of a resin material for electric insulation, as in an example described in JP-A-60-190135 and an example described in JP-A-9-285052, a plurality of gas vent holes are provided in the magnetic winding in the lamination direction thereof and a gas, such as air and hydrogen gas, is caused to flow through these holes, thereby cooling the conductor. In order to vent this gas in the radial direction of the rotor, gas vent holes with a size larger than those provided in the magnetic winding are formed in a creepage block for electric insulation and in wedges for fixing the magnetic winding and the creepage block. The holes in the magnetic winding have a shape of an ellipse that is long in the axial direction of the rotor and, therefore, in order to cause the gas to flow with efficiency, a gas vent groove with a cross section of a circular arc or a rectangular cross section, is formed in a continuous shape in the axial direction of the rotor on the face of a creepage block abutting against the magnetic winding, thereby providing a passage of the cooling gas. Usually, this gas vent groove is simultaneously machined (cut) when a creepage block is cut from a glass-reinforced epoxy resin plate.

In a rotating electric machine such as a turbine generator, the operating temperature of a magnetic winding is apt to rise in association with large capacity design of the rotating machine, causing the problems of the necessity for improving the cooling capacity and the necessity for keeping the strength of a resin material for insulation.

SUMMARY OF THE INVENTION

An object of the invention is to provide a rotating electric machine in which the cooling capacity is improved by increasing the width and depth of a gas vent groove formed in a creepage block.

Another object of the invention is to provide a rotating electric machine in which a fracture of a creepage block that is fabricated from a resin containing reinforcing fibers is prevented near the face of the creepage block abutting the magnetic winding.

The present inventors have concentrated their energies on research in order to solve these problems. As a result, paying attention to the fact that when an attempt is made to improve the cooling capacity by increasing the width and depth of the gas vent groove, the area of the contact face between the creepage block and the magnetic winding decreases, resulting in an increase in the pressure of the contact face between the creepage block and the magnetic winding due to a centrifugal force acting during rotation, and the fact that when the capacity of a rotating electric machine is increased, the amount of thermal expansion of the magnetic winding in the axial direction of the rotor during rotation also tends to increase due to a rise in the temperature of the conductor by energization, the inventors found that high stress concentration occurs near the face of the creepage block abutting against the magnetic winding, which abutting face is subjected to a shearing force in the transverse direction (the axial direction of the rotor) while subjected to a high pressure (in the radial direction of the rotor). Furthermore, the inventors found the problem that in the glass-reinforced epoxy resin fabricated by laminating glass fiber cloths in the plate thickness direction (the radial direction of the rotor), which epoxy resin has so far been used in the creepage block, reinforcing fibers near the face of the creepage block abutting against the magnetic winding are cut during the forming of the gas vent groove from a flat laminate (a sheet material) by machining (cutting) in the plate thickness direction and a slip occurs on an interlayer slip face of the laminate (the face that is sandwiched between reinforcing fibers and is mainly composed of a resin susceptible to a shearing force) in a portion where stresses are concentrated, with the result that the creepage block is fractured near its face abutting against the magnetic winding.

The above problems are solved, for example, to by providing rotating electric machines having the following constituent features.

In an example, in a creepage block of a rotating electric machine fabricated from a resin material containing reinforcing fibers, the reinforcing fibers, which are expressed by drawn lines in which fine patterns of fibers, such as twists, capable of being identified by enlargement are omitted, are continuously disposed to form straight lines and smooth curves along the contour of a gas vent groove. According to this example, during a slip of the interlayer slip face present between the reinforcing fibers that occurs due to a shearing force in the axial direction of a rotor which acts on the creepage block due to a temperature change of the rotor, the slip area is larger than the interlayer slip area in a case where the reinforcing fibers expressed by drawn lines are cut near the machined gas vent groove, are straight lines, and are disposed parallel to a tangent to the circumference of the rotor in the middle of the width of the face abutting against the magnetic winding (a case where a normal of the interlayer slip face is perpendicular to the center line of the rotor). In this case, therefore, the shearing force per slip area decreases, thereby making it possible to prevent a slip fracture between the reinforcing-fiber layers.

In another example, in a creepage block of a rotating electric machine fabricated from a resin material containing reinforcing fibers, drawn lines of an interlayer slip face on a cut section, which drawn lines are expressed by omitting fine patterns on the interlayer slip face capable of being identified by enlargement, such as wrinkles, are continuously disposed to form straight lines and smooth curves along the contour of the gas vent groove. According to this example, during a slip of the interlayer slip face present between the reinforcing fibers that occurs due to a shearing force in the axial direction of a rotor which acts on the creepage block due to a temperature change of the rotor, the slip area is larger than the slip area in a case where the drawn lines of interlayer slip faces on the cut section are straight lines near the machined gas vent groove and are disposed parallel to a tangent to the circumference of the rotor in the middle of the width of the face abutting against the magnetic winding. In this case, therefore, the shearing force per slip area decreases, thereby making it possible to prevent a slip fracture between the reinforcing-fiber layers.

In another example, a plurality of prepreg sheets, in which an unset resin material is caused to be contained in reinforcing fibers which have been woven beforehand, are stacked in layers, and a creepage block of a rotating electric machine is formed by sandwiching these prepreg sheets stacked in layers between a flat press plate and a press plate having projections fitting the shape of gas vent groove. According to this example, near the gas vent groove, the interlayer slip face of the laminate, which slips due to a shearing force in the axial direction of the rotor which acts on the creepage block due to a temperature change of the rotor, is composed of flat and curved surfaces and the area of the slip face is larger than the area of the interlayer slip face of a laminate in a case where the reinforcing fibers are cut near the machined gas vent groove and the interlayer slip face is a flat surface and is disposed parallel to a tangent to the circumference of the rotor in the middle of the width of the face abutting against the magnetic winding. In this case, therefore, the shearing force per slip area decreases, thereby making it possible to prevent a slip fracture between the reinforcing-fiber layers.

In this case, even if microdeformations remain in the creepage block after forming and setting due to the asymmetry of the lamination structure and press working conditions, the creepage block slips on contact faces, including the face abutting against the magnetic winding, while being deforming by adapting to loads acting during the assembling and operation of a rotating electric machine and, therefore, variations in the expansion and contraction of the magnetic winding among the slots due to a temperature change of the rotor has little effect on the generation of vibrations.

In another example, the gas vent groove of a creepage block of a rotating electric machine is formed by being sandwiched between a flat press plate and a press plate having a groove capable of being attached and detached. According to this example, a change in the shape of the gas vent groove can be coped with by replacing the groove alone and, therefore, it is possible to provide at a low cost a creepage block in which a slip fracture between the reinforcing-fiber layers can be prevented by decreasing the shearing force per interlayer slip area.

In another example, the reinforcing fibers of a creepage block of a rotating electric machine are cut beforehand in the longitudinal direction of a gas vent groove. According to this example, the deformation resistance of the reinforcing fibers decreases and the reinforcing fibers can be freely bent. Therefore, even in a case where the depth of the gas vent groove is to be increased and in a case where high-rigidity reinforcing fibers are used, the gas vent groove can be formed by means of press plates and it is possible to provide a creepage block in which a slip fracture between the reinforcing-fiber layers is prevented by forming the flat and curved surfaces of the reinforcing fibers near the gas vent groove, thereby increasing the slip area between the reinforcing fibers and reducing the shearing force per interlayer slip area.

In another example, in a case where the reinforcing fibers near a gas vent groove of a creepage block of a rotating electric machine are cut by machining and the reinforcing fibers expressed by drawn lines in which fine patterns of fibers, such as twists, capable of being identified by enlargement are omitted, are straight lines and are disposed parallel to a tangent to the circumference of the rotor in the middle of the width of the face abutting against the magnetic winding, a sheet is bonded to an outer surface of the creepage block containing the machined face. According to this example, an interlayer slip between the reinforcing fibers can be prevented with the aid of the shearing and elongation deformation resistance of the sheet, as a result of which a slip fracture between the reinforcing-fiber layers can be prevented. Furthermore, by selecting a sheet that has small variations in the friction coefficient among members to which the sheet is in contact (for example, a nomex sheet), it is possible to suppress vibrations which might be caused by variations in the expansion and contraction of the magnetic winding among the slots due to a temperature change of the rotor.

In another example, near a gas vent groove of a creepage clock of a rotating electric machine, short-cut reinforcing fibers are oriented without a specific direction and there is no continuous interlayer slip face in a long range in the direction in which a shearing force acts. In this example, at the same time, there are many interlayer slip faces between the reinforcing fibers in a short range in which a normal is not vertical to the center axis of the rotor. According to this example, the area of the interlayer slip face in a short range can be increased, with the result that the shearing force per unit interlayer slip area near the gas vent groove decreases, making it possible to prevent a slip fracture between the reinforcing fibers. Furthermore, existing interlayer slip faces do not have continuity and, therefore, a slip of an interlayer slip face oriented in the direction in which a shearing force acts cannot continuously propagate to another interlayer slip face, with the result that the shearing force near the gas vent groove increases.

In another example, a creepage block of a rotating electric machine has one or more air vent holes that pierce in the plate thickness direction, and this air vent hole and the air vent groove are disposed so that both communicate with each other. According to this example, a stream of gas that cools the magnetic-winding conductor of rotor can be caused to pass to outside the rotor without being prevented from flowing. Furthermore, even in a case where the gas vent hole is disposed by machining and the reinforcing fibers are cut, by ensuring that the center of the gas vent hole is on the center line of the gas vent groove and that the width of the gas vent groove is larger than that of the gas vent hole, the interlayer slip face between the reinforcing fibers near the gas vent hole is made larger than that near the gas vent groove. In this example, therefore, the shearing force per interlayer slip area near the gas vent hole is smaller than that near the gas vent groove and the interlayer slip resistance is high near the gas vent hole.

In another example, a creepage block of a rotating electric machine has a plurality of pins pressed therein and anchored thereto in the plate thickness direction of the creepage block in places not containing the gas vent hole. According to this example, the pins prevent a lip of interlayer slip faces between the reinforcing fibers that might occur due to a shearing force in the axial direction of the rotor which acts on the creepage block due to a temperature change of the rotor, with the result that a slip fracture between the reinforcing fiber-layers can be prevented. Especially, near the gas vent groove and gas vent hole where the reinforcing fibers are cut by machining, a slip fracture between reinforcing-fiber layers can be prevented by beforehand pressing pins into the creepage block and anchoring the pins thereto as required.

In another example, a creepage block of a rotating electric machine is fabricated from a laminate of a plurality of prepreg sheets obtained by weaving reinforcing fibers containing an unset resin in fabric form. In this creepage block, after being stacked in layers the prepreg sheets are sewn together in the lamination direction with reinforcing fibers in the region not containing the gas vent hole. According to this example, the reinforcing fibers sewn together prevent a lip of interlayer slip faces between the reinforcing fibers that occurs due to a shearing force in the axial direction of the rotor which acts on the creepage block due to a temperature change of the rotor, with the result that a slip fracture between the reinforcing fiber-layers can be prevented. Especially, near the gas vent groove and gas vent hole where the reinforcing fibers are cut by machining, a slip fracture between reinforcing-fiber layers can be prevented by beforehand sewing this portion with reinforcing fibers as required.

DETAILED DESCRIPTION OF THE PREFERRED EMBODIMENTS

The present invention is explained in detail below on the basis of embodiments shown in the drawings.

Figure 1:
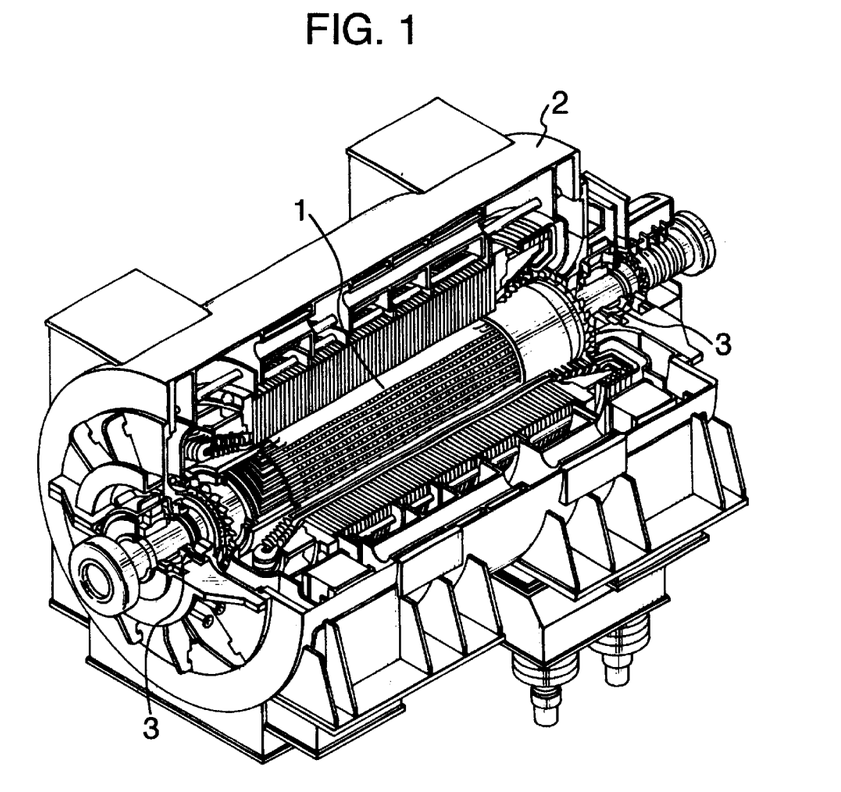
FIG. 1 is a perspective view of a rotating electric machine in one embodiment of the present invention.
Figure 2:
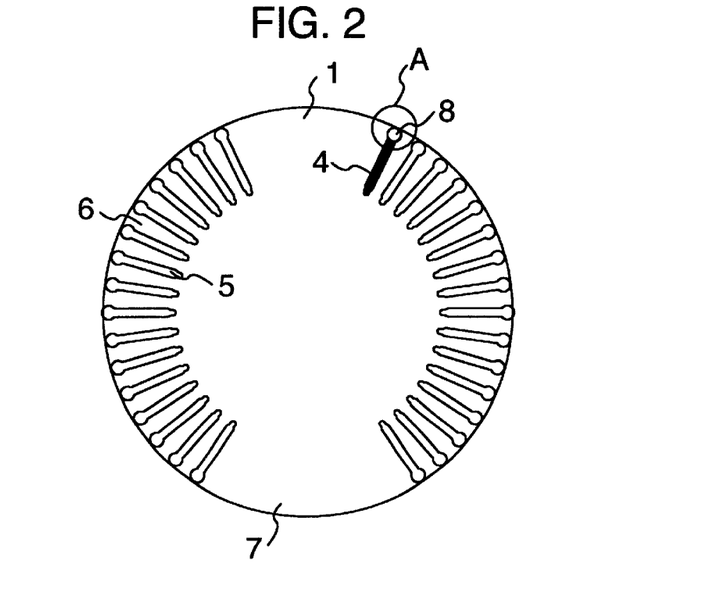
FIG. 2 is a sectional view of a rotor in the one embodiment of the present invention.

FIG. 1 is a perspective view of a rotating electric machine. A rotor 1 has a shape of a cylinder, and is installed in the interior of a stator frame 2 via bearings 3 in two places. FIG. 2 is a sectional view of the rotor 1. The section of the rotor 1 in the axial direction thereof is circular, and slots 5 in which a magnetic winding 4 each is disposed are formed at equally spaced intervals on the circumference of the rotor 1. Members like the teeth of a comb constituting the slots 5 are called teeth 5. The rotor 1 has two or four magnetic-pole portions in which no slot 5 is formed. In the slot 5, a wedge 8 is inserted in the teeth 6 of the rotor 1 so that the magnetic winding 4 does not run out in the radial direction due to a centrifugal force during rotation.

Figure 3:
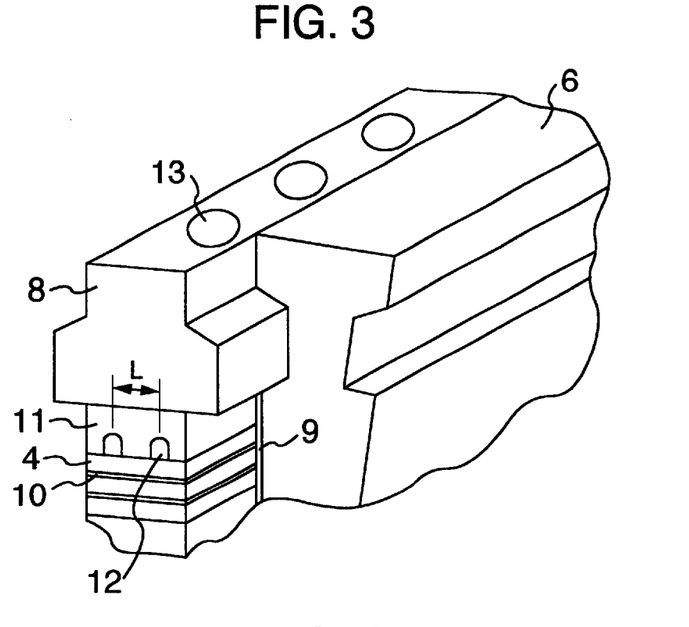
FIG. 3 is an enlarged view of a rotor in the one embodiment of the present invention.

An enlarged view of FIG. 2 is shown in FIG. 3. Within each of the slots 5 that are separated by the teeth 6, there is provided a plate made of resin for electric insulation called a slot armor 9. The magnetic winding 4 each has a section of a rectangle and is laminated in the radial direction alternately with an interlayer insulator 10. A plurality of creepage blocks 11 for electric insulation, which are installed continuously on the magnetic winding 4, abut against the magnetic winding 4 on the extreme circumference and this magnetic winding 4 is made to withstand against a centrifugal force in the radial direction during rotation by a plurality of wedges 8 which are supported by the teeth 6 and, which are installed continuously on the creepage block 11. The magnetic winding 4 and the interlayer insulator 10 have a plurality of radially through magnetic-winding gas vent holes, which are formed by punching, and the creepage block 11 is provided with an axial gas vent groove 12 and a gas vent hole 13, which hole is not shown in the figure, for venting the flow of cooling air, which has passed through the above gas vent holes, to the outside in the radial direction. The wedge 8 is also provided with a plurality of gas vent holes communicating with the creepage block 11, which are formed for the same purpose.

EXAMPLE 1

Figure 4:
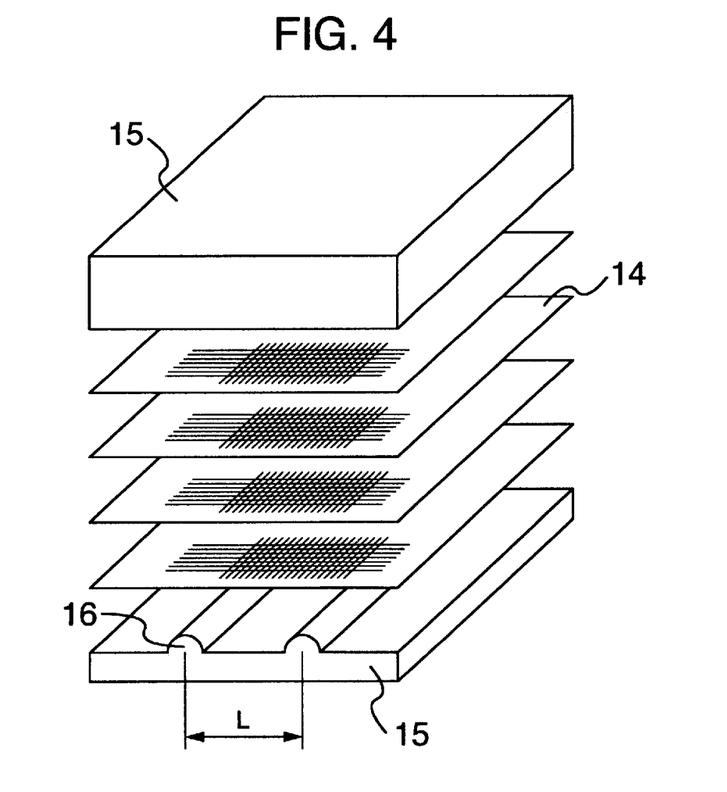
FIG. 4 is a perspective view of press plates for forming a creepage block in the one embodiment of the present invention.

FIG. 4 is a perspective view of resin-material layers constituting a creepage block and a forming press jig. The creepage block is formed by stacking a plurality of prepreg sheets in layers, which prepreg sheets are obtained by causing a semi-set epoxy resin to be contained in clothes woven so that glass fibers intersect at right angles, and by pressing the prepreg sheets under heat by means of press plates 15 to form a laminate. In this example, the press plate 15 that abuts against the face of the creepage block on the side abutting against the magnetic winding is provided with a projection 16 fitting in the shape of the gas vent groove. The projection 16 has its longitudinal direction in the axial direction of the rotor, and in a case where a plurality of gas vent grooves are formed in one slot, the interval L of the gas vent grooves is equal to the interval L of projections on the press plate 15.

Figure 5:
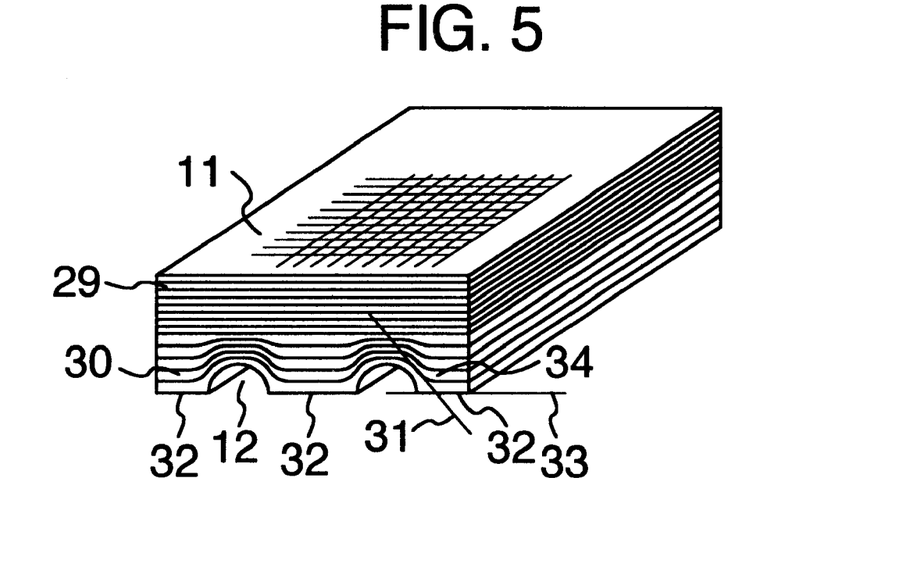
FIG. 5 is a perspective view of a creepage block in the one embodiment of the present invention.

FIG. 5 shows a perspective view of a creepage block 11 which is formed as this example and whose gas vent holes are not shown in the figure. On the cut section 29 intersecting at right angles to gas vent groove 12, reinforcing fibers 30 each having a continuous length appear, and in the prepreg sheet the fibers are not cut and have a continuous form even near the gas vent groove 12. In the case of a gas vent groove with a cross section of a circular arc in which stress concentration is small, it is preferred that the depth of the gas vent groove 12 be not more than ½ or so of the plate thickness of the creepage block 11. According to this example, near the face of the creepage block abutting against the magnetic winding, a tangent 31 of a drawn line of reinforcing fiber has an inclination with respect to a tangent 33 on the circumference of the rotor in the midpoint 32 of the abutting face and, at the same time, the reinforcing fiber 30 has a continuous form. In this example, therefore, the area of an interlayer slip face 34 is larger than a conventional groove formed by machining in which a tangent of a drawn line of reinforcing fiber does not have an inclination with respect to the tangent 33 on the circumference of the rotor in the midpoint 32 of the abutting face, with the result that the shearing force per slip area decreases, thereby preventing an interlayer slip fracture between the reinforcing fibers and ensuring the reliability of a rotating electric machine.

EXAMPLE 2

Figure 6:
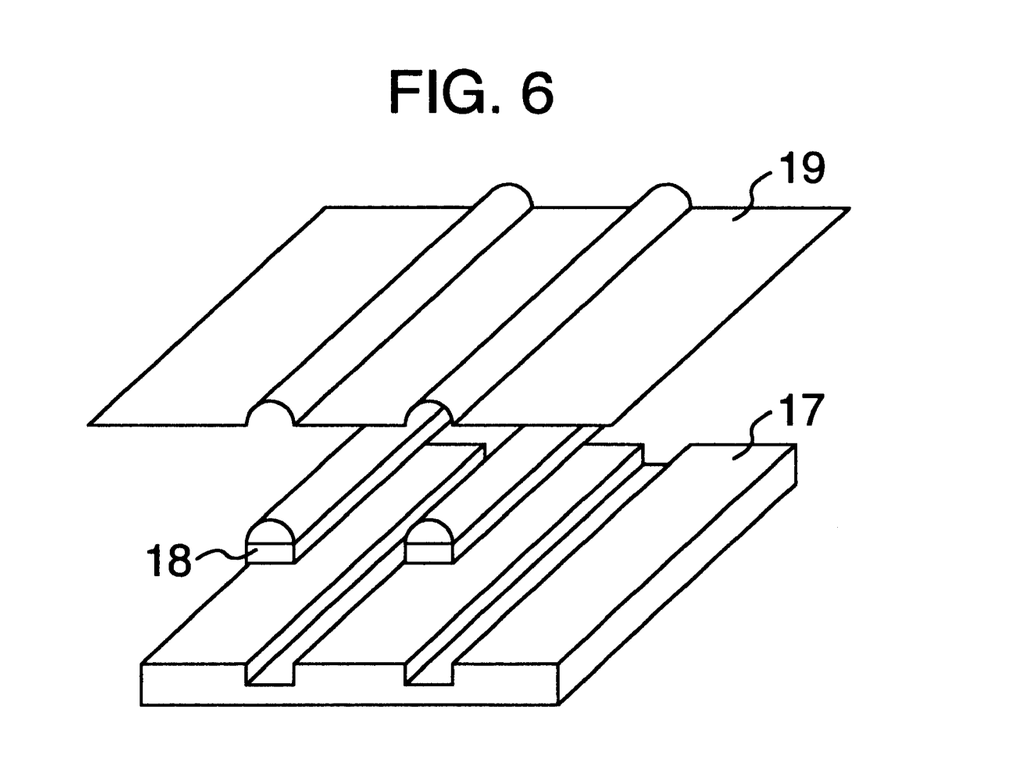
FIG. 6 is a perspective view of a press plate for forming a creepage block in the one embodiment of the present invention.

Another example of the present invention is explained by illustration below. FIG. 6 is a perspective view of a press plate of another type. In this example, a projection 18 forming a gas vent groove can be attached to a press base plate 17 and detached from it. Working a projection beforehand in the press plate of creepage block causes an increase in cost. According to this example, the press base plate 17 with a fitting groove worked therein and a groove section 18 can be separately worked in a flat plate material and, therefore, the cost of working decreases substantially. Furthermore, when a different groove depth of gas vent groove is required, this can be met by replacing the groove section 18 alone. In order to prevent a resin from flowing into a gap between the groove section 18 and the fitting groove of press base plate 17, corners of the gas vent groove can be smoothly worked by laying, for example, a fluoroplastic sheet 19 to which a parting agent is applied in a thin layer and, therefore, deburring becomes unnecessary.

EXAMPLE 3

Figure 7:
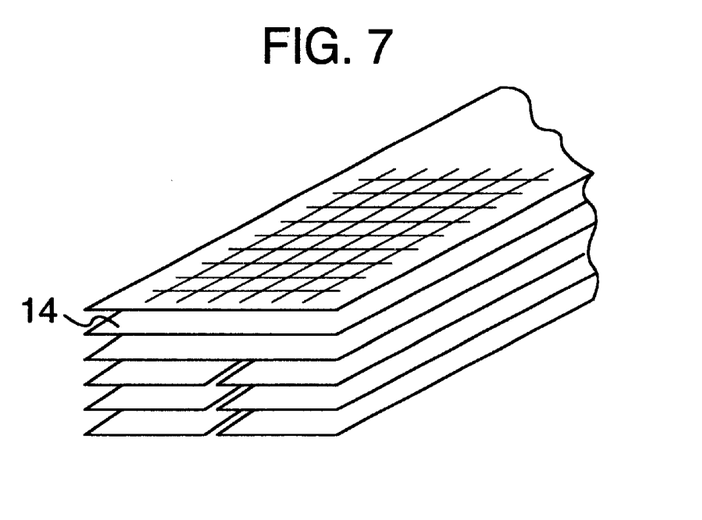
FIG. 7 is a perspective view of prepreg sheets for forming a creepage block in the one embodiment of the present invention.
Figure 8:
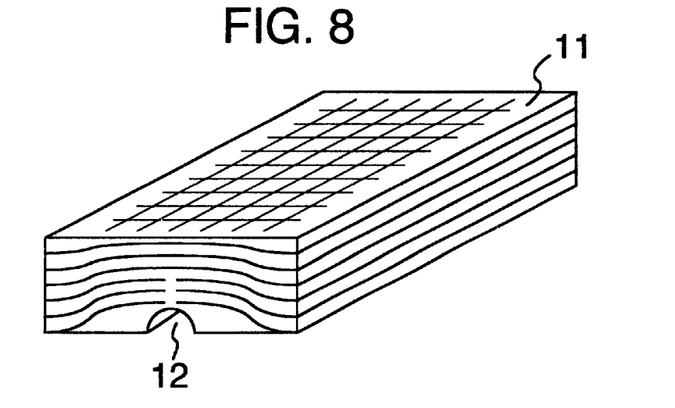
FIG. 8 is a perspective view of a creepage block in the one embodiment of the present invention.
Figure 9:
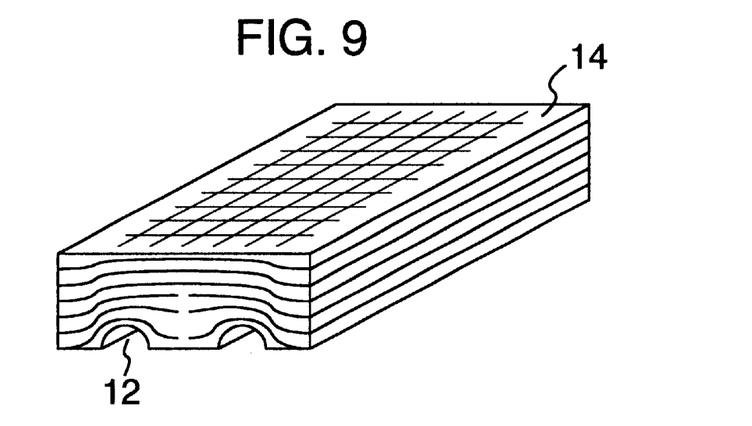
FIG. 9 is a perspective view of a creepage block in the one embodiment of the present invention.

Another example of the present invention is explained by illustration below. FIG. 7 is a perspective view of prepreg sheets. In this example, a plurality of prepreg sheets 14 on the side at which a gas vent groove is to be formed are cut in a position corresponding to about ½ of the width of the creepage block in the direction of the gas vent groove. FIGS. 8 and 9 each show a perspective view of a creepage block, respectively, in a case where one gas vent groove 12 is formed and a case where two gas vent grooves 12 are formed. On a cut section that intersects the gas vent groove 12 at right angles appear reinforcing fibers each having a continuous length. Therefore, according to this example, even when the bending stiffness of the reinforcing fibers constituting the prepreg sheet 14 is high, the fibers become apt to bend freely along the gas vent groove 12. Furthermore, near the face abutting against the magnetic winding where fracture strength poses a problem, an orientation of the reinforcing fibers is obtained in such a manner that a tangent of reinforcing fiber has an inclination with respect to a tangent to the circumference of the rotor at the midpoint of the abutting face. In this case, therefore, the interlayer slip area is larger than in a case where a gas vent groove is formed by performing recessing by mere machining so that a tangent of reinforcing fiber has no inclination with respect to a tangent to the circumference of the rotor at the midpoint of the abutting face. As a result, the shearing force per slip area decreases, thereby making it possible to prevent an interlayer slip fracture between the reinforcing fibers. Furthermore, because a shearing force near the face abutting against the magnetic winding increases, it is possible to improve the cooling capacity by reducing the size of the width of the abutting face and increasing the width and depth of the gas vent groove.

EXAMPLE 4

Figure 10:
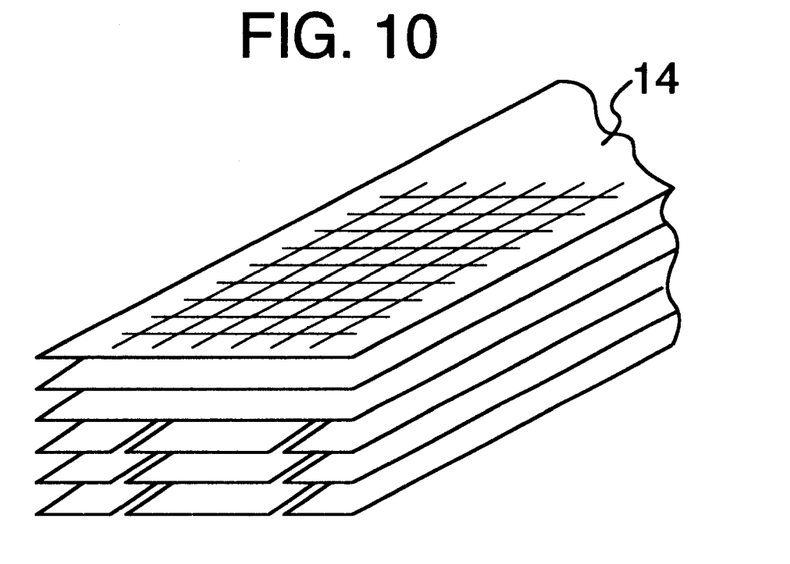
FIG. 10 is a perspective view of prepreg sheets for forming a creepage block in the one embodiment of the present invention.
Figure 11:
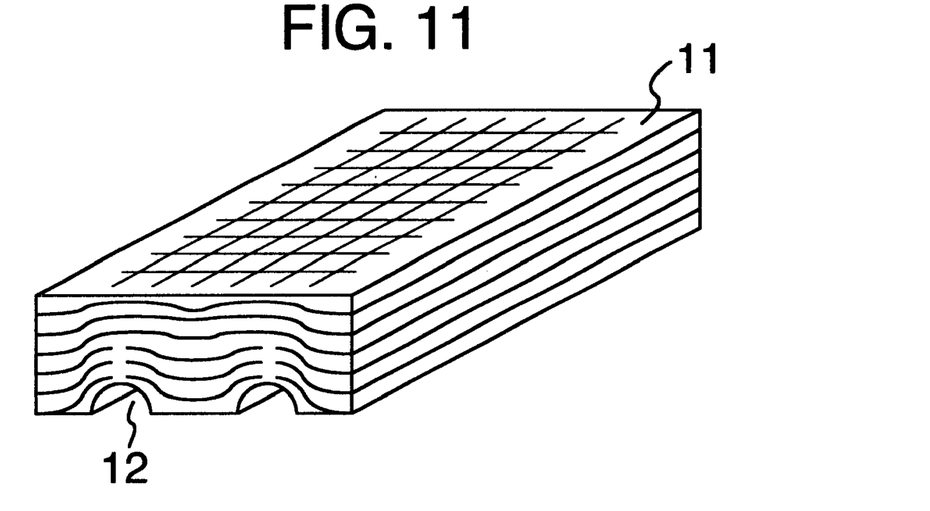
FIG. 11 is a perspective view of a creepage block in the one embodiment of the present invention.

Another example of the present invention is explained by illustration below. FIG. 10 is a perspective view of prepreg sheets. In this example, a plurality of prepreg sheets 14 on the side at which a gas vent groove is to be formed are cut in two positions each corresponding to about ⅓ of the width of the creepage block in the direction of the gas vent groove. FIG. 11 is a perspective view of a creepage block having two gas vent grooves 12 fabricated from these prepreg sheets. According to this example, even when the bending stiffness of the reinforcing fibers constituting the prepreg sheet 14 is high, the fibers become apt to bend freely along the gas vent groove 12. Near the face abutting against the magnetic winding where fracture strength poses a problem, there appear continuous reinforcing fibers, which have an inclination with respect to a tangent to the circumference of the rotor at the midpoint of the abutting face. In this case, therefore, the interlayer slip area is larger than in a case where a gas vent groove is formed by performing recessing by mere machining so that the reinforcing fibers have no inclination with respect to a tangent to the circumference of the rotor at the midpoint of the abutting face. As a result, the shearing force per slip area decreases, thereby making it possible to prevent an interlayer slip fracture between the reinforcing fibers. Furthermore, because the reinforcing fibers enter also a portion between the two gas vent grooves in a bent shape with an inclination with respect to a tangent to the circumference of the rotor at the midpoint of the abutting face, the interlayer slip area increases also in this portion. As a result, the shearing force per slip area decreases, thereby making it possible to prevent an interlayer slip fracture between the reinforcing fibers.

EXAMPLE 5

Figure 12:
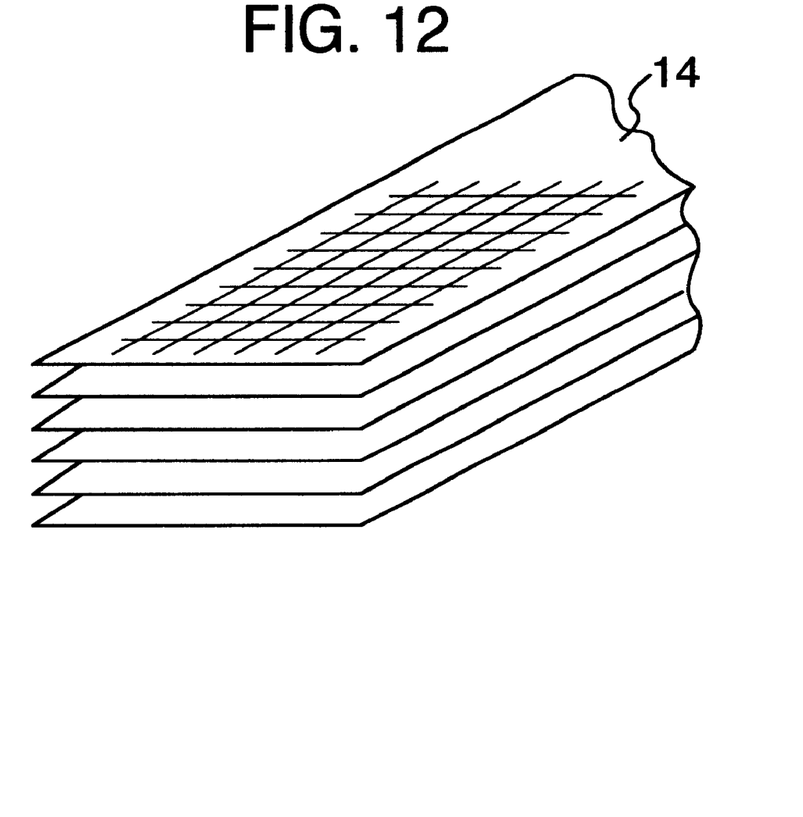
FIG. 12 is a perspective view of prepreg sheets for forming a creepage block in the one embodiment the present invention.
Figure 13:
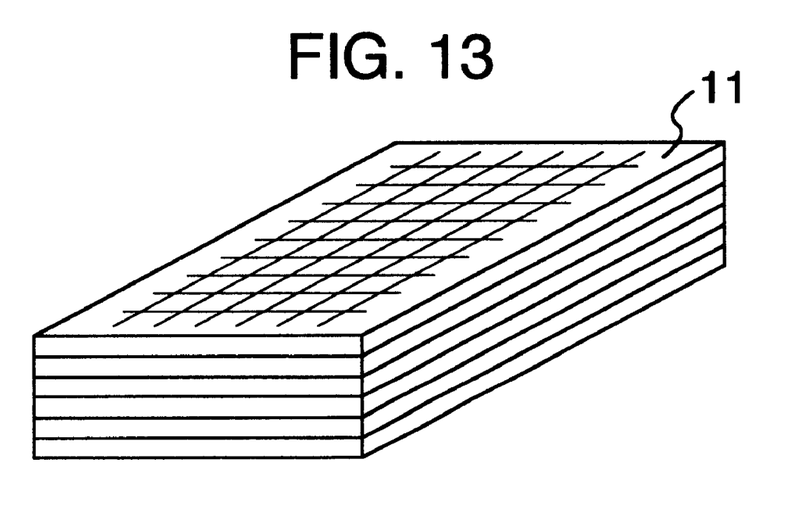
FIG. 13 is a perspective view of a creepage block in the one embodiment of the present invention.
Figure 14:
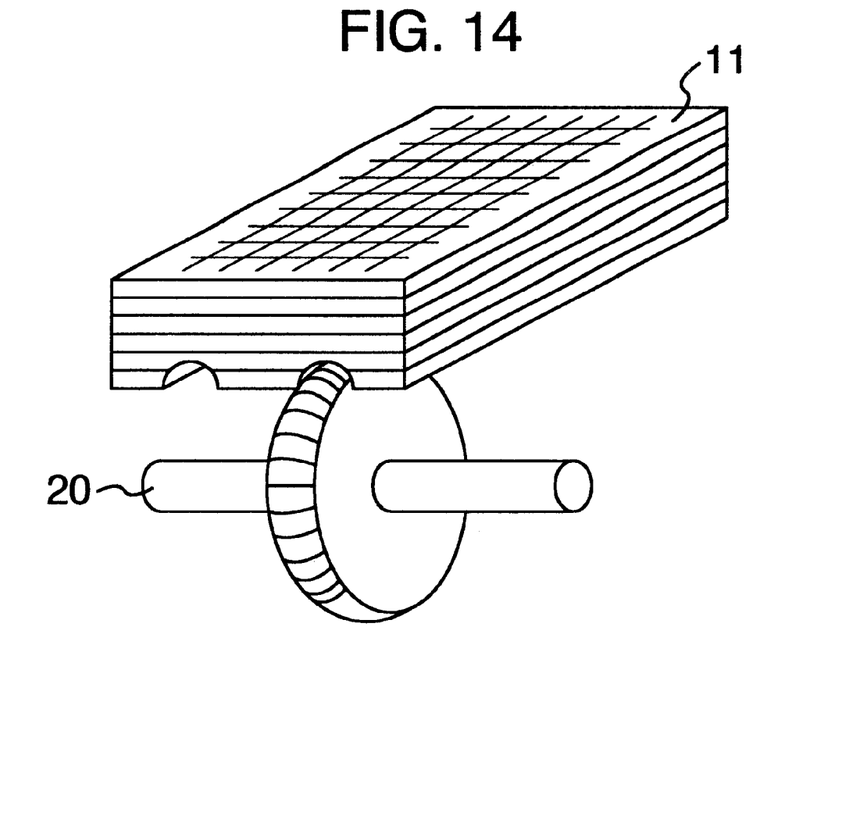
FIG. 14 is a perspective view of a creepage block in the one embodiment of the present invention.
Figure 15:
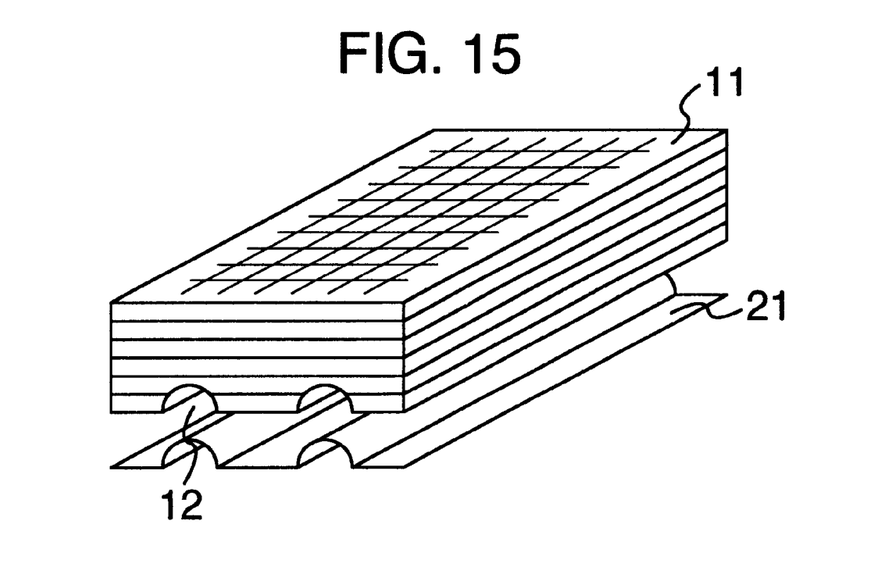
FIG. 15 is a perspective view of a creepage block in the one embodiment of the present invention.

Another example of the present invention is explained by illustration below. FIG. 12 is a perspective view of prepreg sheets 14 stacked in layers. FIG. 13 is a perspective view of a creepage block 11 obtained by the forming of the laminate under heat by means of two flat press plates to form a laminate. FIG. 14 is a perspective view of a creepage block 11. In this example, gas vent grooves are formed by machining. When a gas vent groove is cut by means of a cutter 20 as in a creepage block obtained by a conventional technique, a part of the laminated reinforcing-fiber layers is cut near the gas vent groove. FIG. 15 is a perspective view of a creepage block. In this example, a sheet 21 containing reinforcing fibers is bonded to the face of the creepage block, worked by cutting in FIG. 14, which abuts against the magnetic winding and to the face where the gas vent grooves are worked. As the sheet 21, it is preferred to use a sheet in which short glass fiber is dispersed in a thin epoxy-resin film, for example, a nomex sheet, an interlayer insulating material, etc. According to this example, a slip of an interlayer slip face 32 of a laminate which contains the reinforcing fibers cut by machining is prevented by the shearing and elongation deformation resistance of the sheet 21. Therefore, the shearing strength in a portion where stresses are concentrated near the face abutting against the magnetic winding increases, thereby making it possible to prevent the occurrence of a surface crack and a fracture, such as an interlayer slip. Furthermore, a nomex sheet has the feature that variations in the friction coefficient among magnetic windings are small and, therefore, the thermal elongation force of magnetic winding does not vary among the slots. As a result, variations in the bending moment with respect to a rotating shaft can be held to a small level, producing the effect that shaft vibrations during rotation are reduced.

EXAMPLE 6

Figure 16:
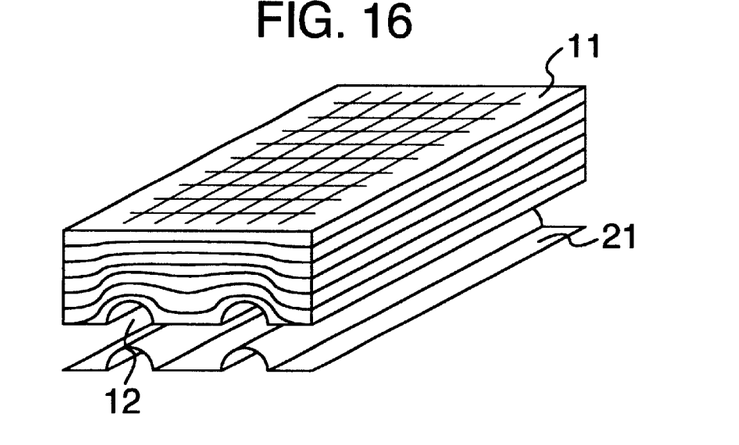
FIG. 16 is a perspective view of a creepage block in one embodiment of the present invention.

Another example of the present invention is explained by illustration. FIG. 16 is a perspective view of a creepage block 11. In this example, a gas vent groove 12 of the creepage block 11 is integrally formed by press working so that the reinforcing fibers show a continuous form around the gas vent groove 12, as shown in FIG. 5. A sheet 21, for example, a nomex sheet is bonded to this creepage block during or after forming. According to this example, due to the existence of the continuous reinforcing fibers, the shearing strength near the face of the gas vent groove 12 against the magnetic winding is increased by the addition of the nomex sheet and, at the same time, variations both in the friction coefficient among the magnetic windings and in the amount of thermal elongation of magnetic winding among the slots decrease, with the result that the occurrence of shaft vibrations can be suppressed and the reliability of a rotating electric machine is improved. Incidentally, by bonding a nomex sheet to places of the creepage block other than the place shown in FIGS. 15 and 16, the laminate can be reinforced against an interlayer slip and variations in the friction coefficient can be reduced, thereby producing a further effect on an increase in the strength of the creepage block and on the suppression of shaft vibrations of the rotor.

EXAMPLE 7

Figure 17:
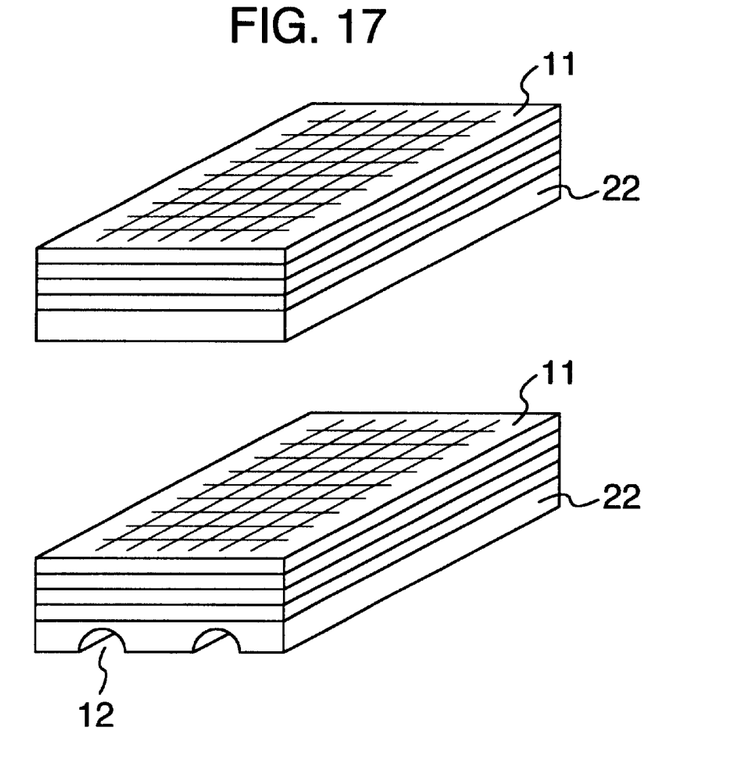
FIG. 17 is a perspective view of a creepage block in the one embodiment of the present invention.

Another example of the present invention is explained by illustration. FIG. 17 is a perspective view of a creepage block. In this example, during the forming of a laminate of prepreg sheets under heat and pressure, a resin material 22 with which reinforcing fiber of short glass fiber, etc. are mixed or a heat-resistant resin, such as PEEK (polyether ether ketone), is integrally formed under heat and pressure, whereby a gas vent groove 12 is machined in the portion of resin material 22. According to this example, the interlayer slip strength of this portion is not reduced by the working of the gas vent groove, thereby eliminating the need for the step of bonding a nomex sheet after the formation of the gas vent groove. In other words, the region near the face of the gas vent groove 12 abutting against the magnetic winding is reinforced by short fibers which are irregularly oriented, and, in the direction in which a shearing force in the axial direction of the rotor acts, slip faces between short fibers are irregularly oriented and there is no continuous interlayer slip face. Therefore, the slip resistance in this example is higher than the interlayer slip resistance between reinforcing fibers peculiar to a laminate of prepreg sheets in which, for example, reinforcing fibers are woven in fabric form and an unset resin is caused to be contained.

EXAMPLE 8

Figure 18:
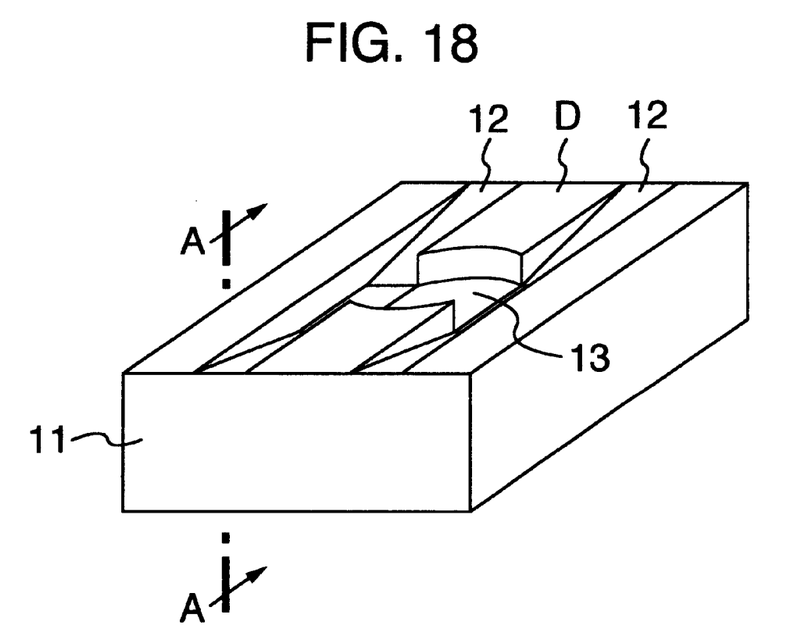
FIG. 18 is a partially enlarged perspective view of a creepage block in the one embodiment of the present invention.
Figure 19:
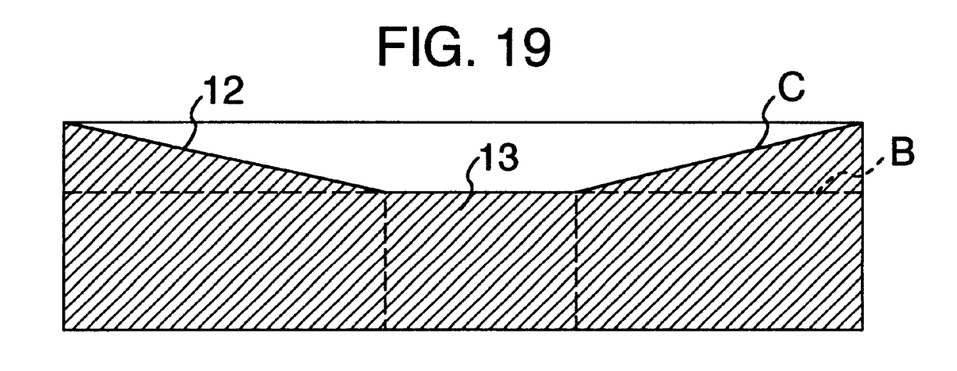
FIG. 19 is a partially enlarged sectional view of a creepage block in the one embodiment of the present invention.
Figure 20:
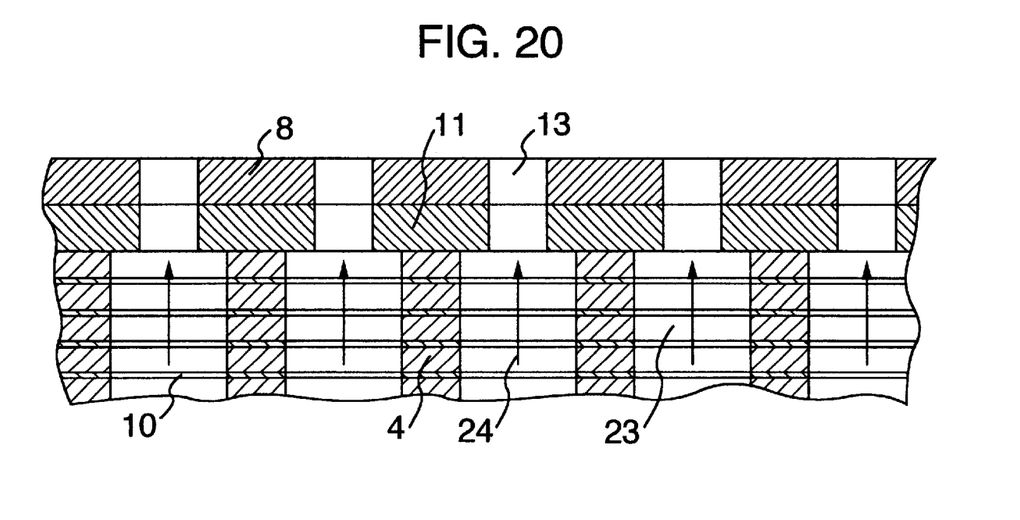
FIG. 20 is a sectional view of a rotor in the one embodiment of the present invention.

Another example of the present invention is explained by illustration. FIG. 18 is a partially enlarged perspective view of a creepage block 11 containing one gas vent hole, as viewed from the side at which the creepage block abuts against a magnetic winding. FIG. 19 is a sectional view taken on line A—A of FIG. 18, which passes the center of a has vent groove 12 at left. FIG. 20 is a sectional view of the rotor in the axial direction, which passes the center of the gas vent hole 13 and contains a plurality of gas vent holes. In FIG. 18, the creepage block 11 has a gas vent hole 13 that communicates with a gas vent hole of a wedge. Furthermore, a gas vent groove 12 that communicates with a magnetic-winding gas vent hole made in a magnetic winding is formed with a certain inclination toward the gas vent hole 13. In FIG. 19 which is a sectional view taken on line A—A of FIG. 18, a portion C, which is enclosed with an assumed extension face B of the maximum depth of the gas vent groove in the axial direction of the rotor and with the surface of the groove 12, exists and, therefore, even when the middle portion D of the creepage block shown in FIG. 18 is subjected to a shearing force in the axial direction of the rotor, damage can be prevented by the reinforcement effect of portion C to prevent an interlayer slip. In FIG. 20, a stream of cooling gas 24 which has passed a magnetic-winding gas vent hole 23 made in the magnetic winding 4 in the radial direction of the rotor can pass through the gas vent holes 13 of the creepage block 11 and wedge 8 without being preventing from flowing.

EXAMPLE 9

Figure 21:
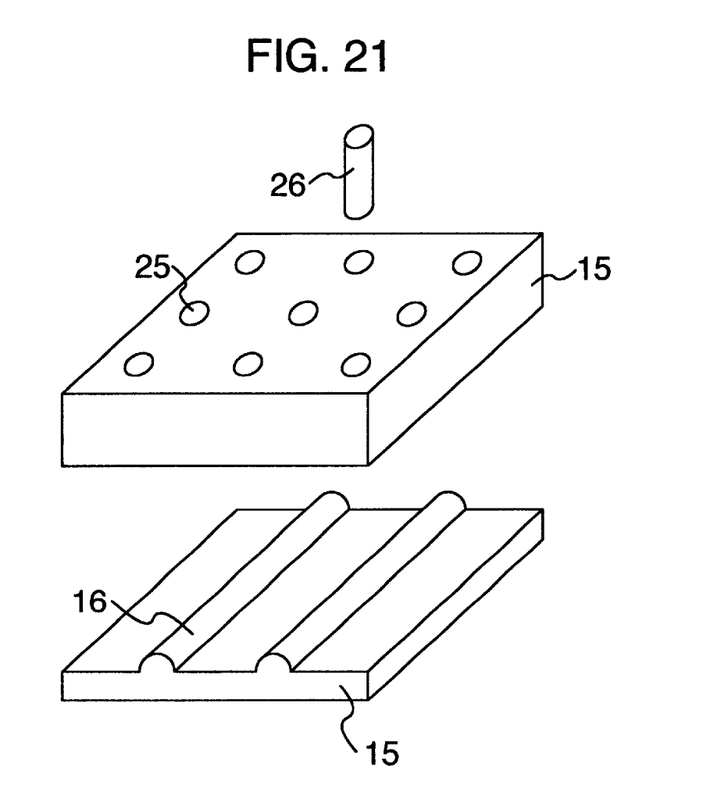
FIG. 21 is a perspective view of press plates for forming a creepage block in the one embodiment of the present invention.
Figure 22:
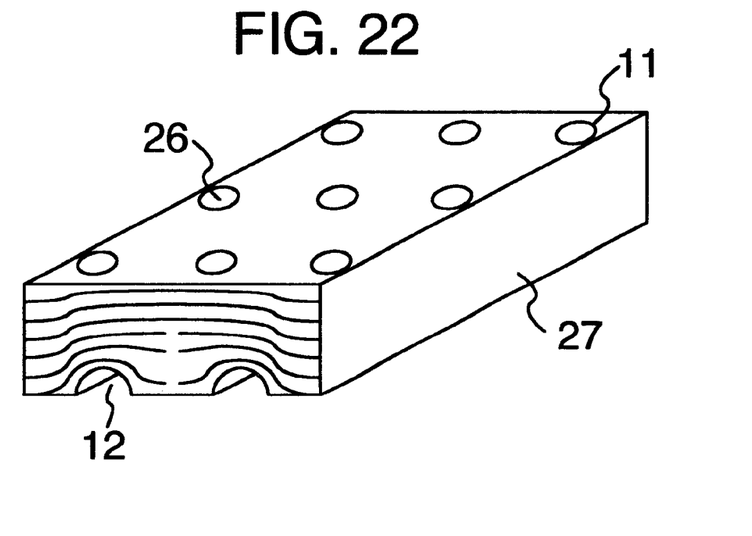
FIG. 22 is a perspective view of a creepage block in the one embodiment of the present invention.

Another example of the present invention is explained by illustration. FIG. 21 is a perspective view of a press plate for pressing a creepage block. In this example, one flat press plate 17 is provided with a plurality of holes 25 in the positions that sandwich a projection 16 disposed on an opposed press plate 15. In addition, there are provided the same number of pins 26 to be engaged into the holes 25 as the number of the holes 25. During the pressing of a plurality of prepreg sheets stacked in layers between the two press plates 15 which are opposed to each other, the pins 26 are pressed in under pressure from the holes 25 so that the pins 26 penetrate a part or all of the prepreg sheets. The pins 26 and the prepreg sheets are heated and pressed and the pins 26 become anchored to the prepreg sheets. FIG. 22 is a perspective view of a creepage block 11 formed in this step. The pin 26 may be fabricated from a resin material having longitudinally continuous reinforcing fibers or discontinuous reinforcing fibers, for example, continuous glass fibers, or may be a metal body coated with an electric insulator. In a case where the creepage block 11 is mounted on the rotor by means of this pin 26 and subjected to a shearing force in the axial direction, the pin 26 prevents a slip fracture near the face of the gas vent groove 12 abutting against the magnetic winding where stresses are concentrated, and is further effective in preventing a slip of an interlayer slip face of a reinforcing-fiber layer 27. FIG. 22 shows a case where the step of heating and pressing is performed after the portion near the middle of the prepreg sheet on the side of the gas vent groove is cut in the axial direction of the rotor beforehand. However, this example can also be applied to a case where a creepage block is formed from uncut prepreg sheets and a case where the gas vent groove 12 is formed by machining. Further, by installing the pin in places other than the position of the gas vent hole, it is also possible to prevent an interlayer slip between the reinforcing fibers of the creepage block.

EXAMPLE 10

Figure 23:
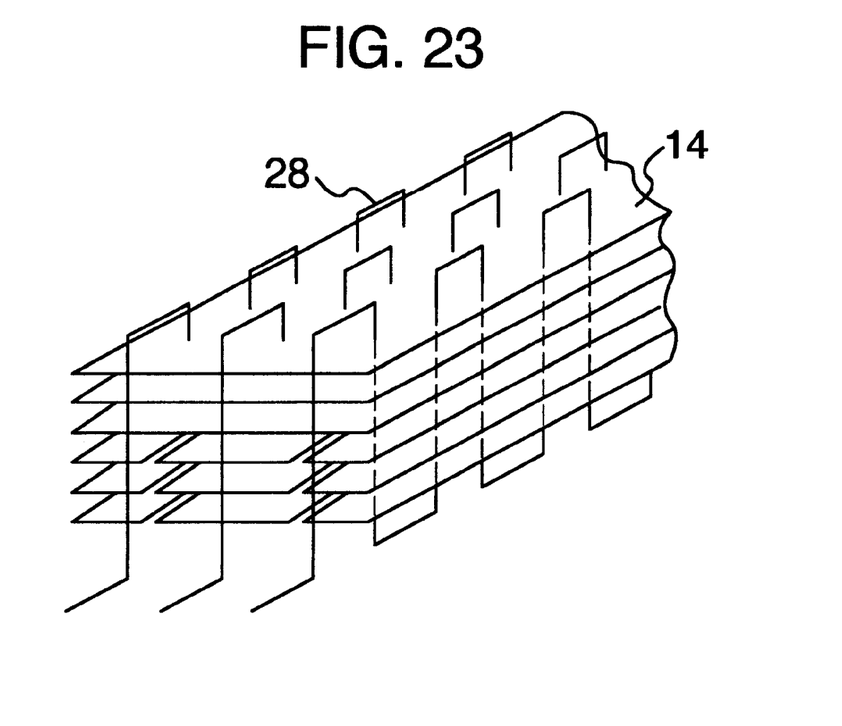
FIG. 23 is a perspective view of prepreg sheets for forming a creepage block in the one embodiment of the present invention.

Another example of the present invention is explained by illustration. FIG. 23 is a perspective view of prepreg sheet4

14. In this example, prepreg sheets 14 which are stacked in layer beforehand are sewn together in the lamination direction with reinforcing fibers, for example, glass fibers to thereby provide reinforcement against a slip between the prepreg sheets. A creepage block formed by this method provides increased resistance against an interlayer slip between the reinforcing fibers, resulting an increase in shearing strength.

In all the above embodiments of the invention, explanations were made of the cases where the lamination faces of the reinforcing fibers of the creepage block 11 are parallel to the face of the creepage block abutting the magnetic winding and, at the same time, the weave patterns of the reinforcing fibers are at right angles and parallel to the longitudinal direction of the gas vent groove. However, the weave patterns of the reinforcing fibers may not be at right angles and parallel to the longitudinal direction of the gas vent groove. Further, when the air vent groove is formed by machining, the lamination faces of the reinforcing fibers may not be parallel to the face of the creepage block abutting the magnetic winding. For example, in a case where the lamination faces of the reinforcing fibers are vertical to the face of the creepage block abutting the magnetic winding and are, at the same time, parallel to the axial direction of the rotor, the reinforcing fibers near the face abutting the magnetic winding are vertical to the face abutting the magnetic winding and are, at the same time, oriented parallel to the direction of a shearing force. In this case, therefore, the interlayer slip area between the reinforcing fibers subjected to a shearing force acting in the axial direction of the rotor increases and the shearing force per slip face area decreases. Furthermore, also in a case where the lamination faces are vertical to the axial direction of the rotor, the interlayer slip faces become vertical to the direction of a shearing force. In this case, therefore, the interlayer slip area increases and the shearing force per slip face area decreases. Accordingly, in any of these cases, a slip fracture between the reinforcing fibers can be prevented, with the result that the reliability of a rotating electric machine can be improved.

According to the present invention, it is possible to manufacture a rotating electric machine with improved cooling capacity and reliability.

What is claimed is:

1. A rotating electric machine comprising a stator frame, a rotor installed in said stator frame via a bearing, a slot formed on said rotor to have an opening on an external peripheral surface of said rotor, a magnetic winding disposed within said slot, and a creepage block fabricated from a resin material containing reinforcing fibers, said creepage block abutting against said magnetic winding and being supported in the region of said opening, wherein said creepage block contains a gas vent groove formed so that the axial direction of said rotor becomes the longitudinal direction of said gas vent groove, and wherein said reinforcing fibers are disposed so that at least one of tangents to draw lines of said reinforcing fibers, which appear on a cut section of said creepage block intersecting the axial direction of said rotor, has an inclination with respect to a tangent to the circumference of said cut section at the midpoint of the width of the creepage block abutting against said magnetic winding on said cut face.

2. A rotating electric machine comprising a stator frame, a rotor installed in said stator frame via a bearing, a slot formed on said rotor to have an opening on an external peripheral surface of said rotor, a magnetic winding disposed within said slot, and a creepage block fabricated from a resin material containing reinforcing fibers, said creepage block abutting against said magnetic winding and being supported in the region of said opening, wherein said creepage block contains a gas vent groove formed so that the axial direction of said rotor becomes the longitudinal direction of said gas vent groove, wherein said creepage block is formed from a laminate of a resin material containing said reinforcing fibers, and wherein said laminate is formed so that at least one of tangents to interlayer slip faces of said laminate, which are present on a cut section of said creepage block intersecting the axial direction of said rotor, has an inclination with respect to a tangent to the circumference of said cut section at the midpoint of the width of the creepage block abutting against said magnetic winding on said cut face.

3. A rotating electric machine according to claims 1 or 2, wherein, in a process for obtaining said creepage block by sandwiching a laminate comprising a plurality of prepreg sheets stacked in layers between press plates, by compressing said laminate in the lamination direction, and by causing said laminate to set, said reinforcing fibers being woven in cloth form beforehand and an unset resin material being caused to be contained in said reinforcing fibers, one of said press plates has a continuous projection.

4. A rotating electric machine according to claim 3, wherein said creepage block is formed between said press plates, one of said press plates having a continuous projection capable of being attached thereto and detached therefrom.

5. A rotating electric machine according to claim 3, wherein said creepage block is fabricated from a plurality of prepreg sheets selected from of said laminated multiple prepreg sheets, including a prepreg sheet in contact with said projection, said selected plurality of prepreg sheets being beforehand cut in the longitudinal direction of said projection.

6. A rotating electric machine comprising a stator frame, a rotor installed in said stator frame via a bearing, a slot formed on said rotor to have an opening on an external peripheral surface of said rotor, a magnetic winding disposed within said slot, and a creepage block fabricated from a resin material containing reinforcing fibers, said creepage block abutting against said magnetic winding and being supported in the region of said opening, wherein said creepage block contains a gas vent groove formed so that the axial direction of said rotor becomes the longitudinal direction of said gas vent groove, wherein said gas vent groove of said creepage block is formed by machining after the forming and setting of a resin material containing reinforcing fibers, and wherein after the machining of said gas vent groove, a sheet is bonded to an outer surface of said creepage block containing, at least, the surface of said gas vent groove.

7. A rotating electric machine according to claim 6, wherein, after the simultaneous compression in the lamination direction, forming and setting of a reinforcing-fiber-containing resin material from which said gas vent groove of said creepage block is fabricated and a laminate which is obtained by laminating a plurality of said prepreg sheets, said gas vent groove of said creepage block is formed by machining in said resin material.

8. A rotating electric machine according to any one of claims 1 to 7, wherein said creepage block has one or more gas vent holes that pierce in the plate thickness direction and wherein said gas vent groove and said gas vent hole are disposed so that both communicate with each other.

9. A rotating electric machine according to any one of claims 1 to 8, wherein said creepage block has a plurality of pins pressed therein and anchored thereto in the plate thickness direction of said creepage block in places not containing said gas vent hole.

10. A rotating electric machine according to any one of claims 1 to 8, wherein, after laminating a plurality of said prepreg sheets obtained by weaving reinforcing fibers containing an unset resin in fabric form and stacking in layers, said prepreg sheets are sewn together in the lamination direction with reinforcing fibers in the region not containing said gas vent hole.

* * * * *